United States Patent [19]
van der Merwe et al.

[11] Patent Number: 4,977,674
[45] Date of Patent: * Dec. 18, 1990

[54] VEHICLE WITH TELESCOPIC BOOM FOR POWER DRIVEN PLANT TRIMMING TOOLS

[76] Inventors: Jacobus C. van der Merwe; Lucas C. van der Merwe, both of 801 Beechwood Dr., Kingsport, Tenn. 37663

[*] Notice: The portion of the term of this patent subsequent to Sep. 22, 2004 has been disclaimed.

[21] Appl. No.: 399,878

[22] Filed: Aug. 29, 1989

Related U.S. Application Data

[63] Continuation-in-part of Ser. No. 67,862, Jun. 30, 1987, which is a continuation-in-part of Ser. No. 886,801, Jul. 18, 1986, Pat. No. 4,694,577.

[51] Int. Cl.$^5$ .............................................. B23D 45/20
[52] U.S. Cl. ...................................... 30/379.5; 56/234; 280/776
[58] Field of Search .................... 280/776; 104/244.1; 30/180, 296 K, 228, 379.5; 56/233, 234, 328 R, 39

[56] References Cited

U.S. PATENT DOCUMENTS

4,694,577  9/1987  van der Merwe et al. ......... 30/379.5

Primary Examiner—Douglas D. Watts
Assistant Examiner—Willmon Fridie, Jr.
Attorney, Agent, or Firm—Fleit, Jacobson, Cohn, Price, Holman & Stern

[57] ABSTRACT

A device for supplying power to a plurality of power driven plant trimming tools is formed by a wheeled vehicle having a pair of driving wheels mounted on a vehicle frame. At least one steered wheel is rotatably mounted on the vehicle frame and is pivotal about a vertical axis for steering the vehicle. An engine is supported by the vehicle frame, and a power source is driven by the engine for supplying power to the power driven plant trimming tools. A telescopic arm and connector supporting structure, having a pair of telescopic arms is provided. A plurality of telescopic sections form each telescopic arm. Each telescopic section is constructed as a lattice. A hollow tube forms a part of each lattice and is interconnected with hollow tubes forming a part of other lattices of the telescopic arm. An operating fluid transmission and supply connection is disposed between adjacent telescopic sections for both supplying power from the power source to the power driven plant trimming tools and for fluidly interconnecting the adjacent telescopic sections. A hydraulic drive for propelling the vehicle is also provided. The hydraulic drive is also driven by the engine.

3 Claims, 7 Drawing Sheets

VEHICLE WITH TELESCOPIC BOOM FOR POWER DRIVEN PLANT TRIMMING TOOLS

This application is a continuation-in-part of application Ser. No. 07/067,862, filed June 30, 1987, which is a continuation-in-part of application Ser. No. 06/886,801, filed July 18, 1986, now U.S. Pat. No. 4,694,577.

BACKGROUND OF THE INVENTION

The present invention relates to an improved vehicle for providing power to a plurality of power driven plant trimming tools, and more particularly to a vehicle that is adapted to be driven by an operator so as to direct the vehicle, which includes a support structure having telescopic boom, through a cultivated field. The boom includes arms with telescopic sections having air lines for feeding compressed air to a plurality of manually controlled, pneumatically operated pruning devices. The invention also relates to an improved hydraulic or hydrostatic drive arrangement for the vehicle.

DESCRIPTION OF THE PRIOR ART

Trimming of plants, vines, trees, and the like is performed to stimulate proper growth. Hand-operated pruning devices are often used to perform the trimming operations. However, the use of such manual devices is frequently tiring, and the trimming or pruning of large diameter branches is often quite difficult. Accordingly, a compressed-air-operated tree trimmer is disclosed in U.S. Pat. No. 4,347,880, issued Sept. 7, 1982, to the inventor of the present invention. The device disclosed in that patent is a single cut trimming device that is extendable by adding a suitable number of tubes and rods.

U.S. Pat. No. 4,541,177 issued Sept. 17, 1985, to Brian Hollander, discloses a delimbing shear attachment for a movable boom mounted on a motorized or self-propelled vehicle having an operator's station, such as a cab or platform. The operator controls the movement of the boom and the application of hydraulic power to the delimbing shear attachment mounted on the end of the boom.

U.S. Pat. No. 4,411,070, issued Oct. 25, 1983, to George A. Boyum et al., discloses a tree trimming apparatus mounted on a mobile support vehicle. The apparatus includes a telescopic unit pivotally mounted on a pedestal. A large diameter circular saw is mounted at the end of the boom and is powered by high-speed hydraulic motor to provide high cutting efficiency.

It is an object of the present invention to provide an improved vehicle for providing power to a plurality of manually controlled, power-operated pruning units to permit pruning to be accomplished simultaneously in a plurality of rows of plants.

SUMMARY OF THE INVENTION

Briefly stated, in accordance with one aspect of the present invention, a vehicle for supplying power to a plurality of power driven plant trimming tools is provided. The vehicle is wheeled and has a pair of driving wheels mounted on a vehicle frame, at least one steered wheel rotatably mounted on the vehicle frame and pivotal about a vertical axis for steering the vehicle. An engine supported by the vehicle frame and a power source driven by the engine for supplying said power to said power driven plant trimming tools are provided. A telescopic arm and connector supporting structure having a pair of telescopic arms are also provided. A plurality of telescopic sections form each telescopic arm. Each telescopic section is constructed as a lattice, with a hollow tube forming a part of each lattice interconnecting hollow tubes forming a part of other lattices of the telescopic arm. An operating fluid transmission and supply connection is disposed between adjacent telescopic sections for both supplying power from the power source to the power driven plant trimming tools and for fluidly interconnecting the adjacent telescopic sections. A hydraulic drive circuit for propelling the vehicle is also provided. The hydraulic drive circuit is also driven by the engine.

DESCRIPTION OF THE PREFERRED EMBODIMENTS

Figures 1, 7:
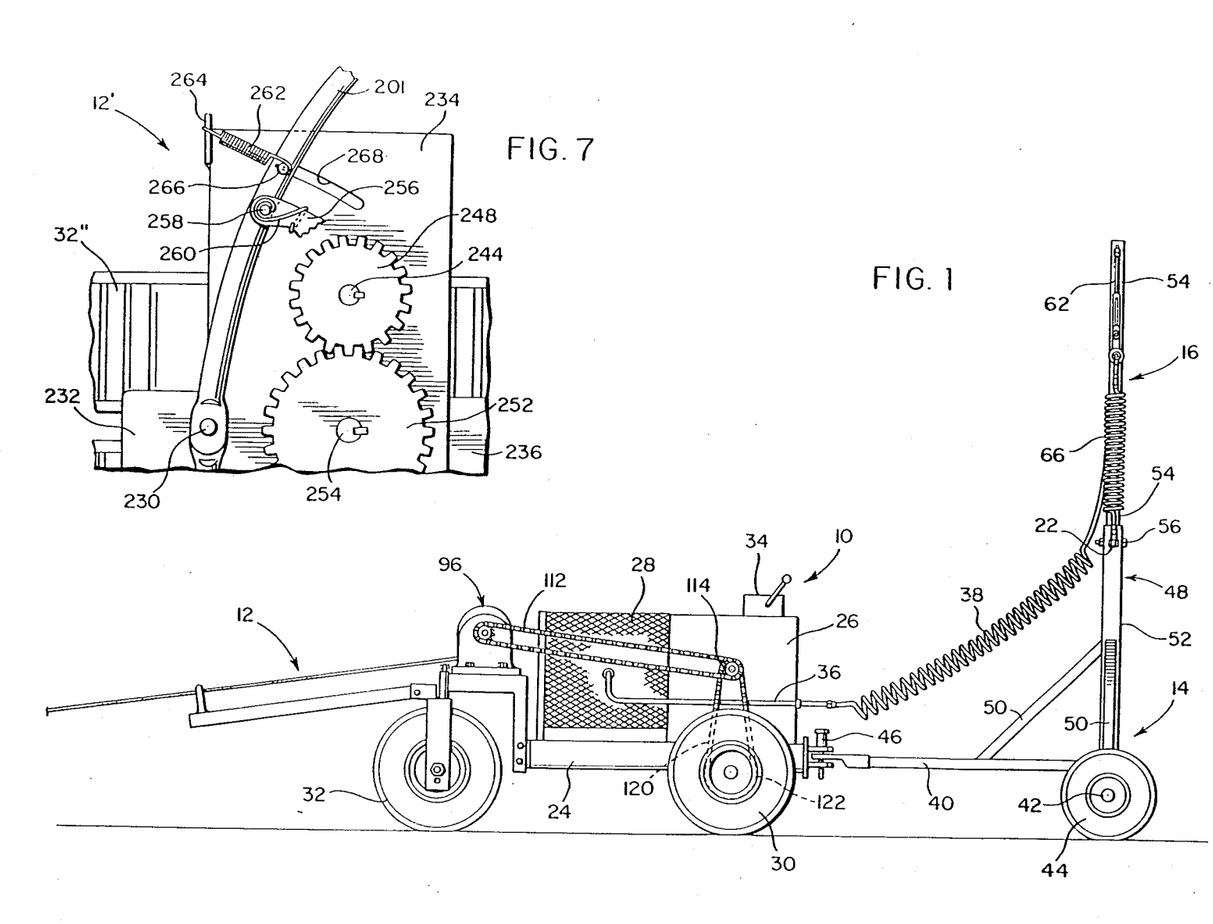
FIG. 1 is a side view of a self-propelled, self-steered plant trimming apparatus in accordance with the present invention.
FIG. 7 is an enlarged view of a portion of the self-steering mechanism of FIG. 5.
Figure 2:
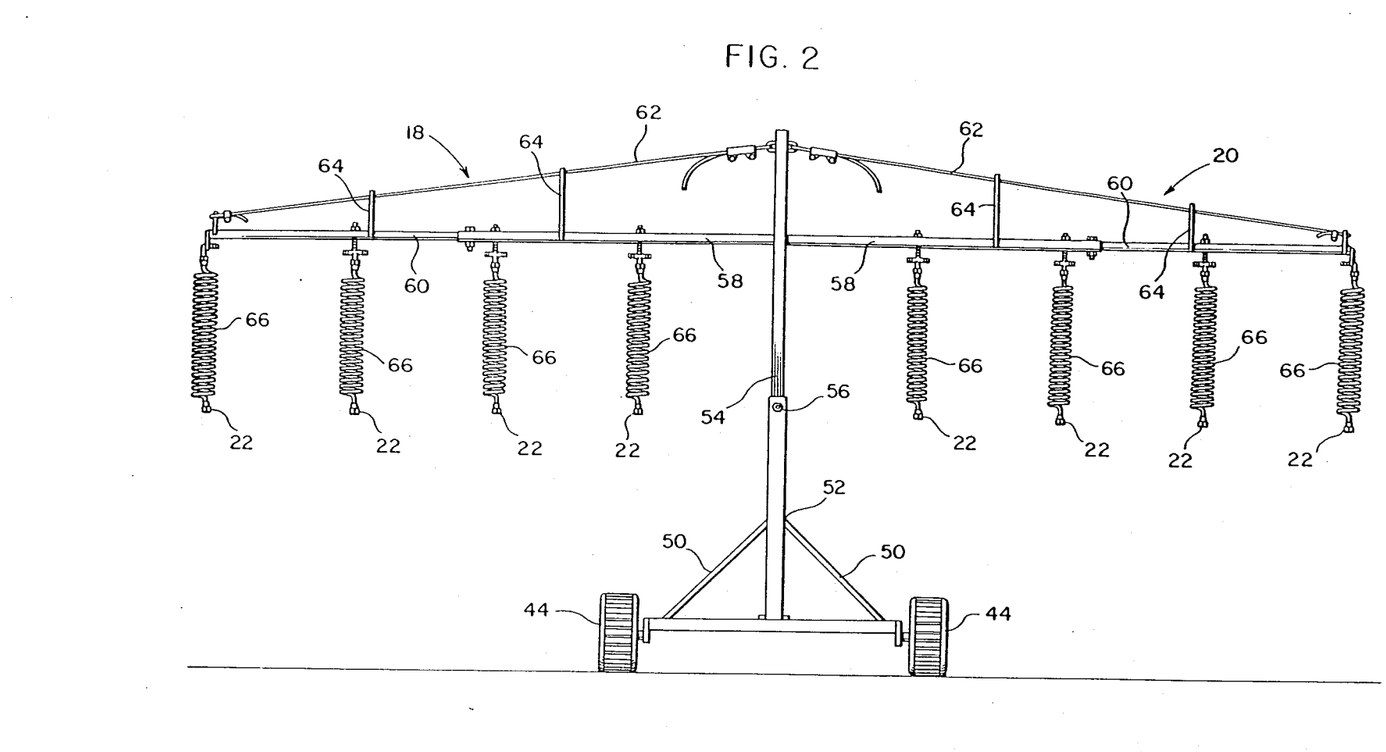
FIG. 2 is a rear end view of the apparatus of FIG. 1, showing the structural arrangement of a carrier for supporting a plurality of connections of individual plant trimming tools.

Referring now to the drawings, and particularly to FIGS. 1 and 2, there is shown a self-propelled vehicle 10 which includes a self-steering mechanism 12 at its forward end, and which draws a wheeled trailer 14 that carries a supporting structure 16 including a pair of laterally extending telescopic arms 18, 20. Arms 18, 20 support a plurality of connectors 22, each adapted to connect with a respective power operated trimming tool (not shown), such as a pruning device of the type disclosed in U.S. Pat. No. 4,347,880, issued Sept. 7, 1982, the disclosure of which patent is incorporated herein by reference.

Vehicle 10 includes a frame 24 that supports an engine 26 and a power source 28 to operate the trimming tools. A pair of driving wheels 30 are supported at one end of frame 24, on opposite sides thereof, and a steered wheel 32 is provided at the opposite end of frame 24. Engine 26 can be any convenient source of rotary power, such as a gasoline or diesel engine, and includes a throttle or speed control means 34 for permitting the speed of vehicle 10 to be set at any predetermined speed value.

Power source 28 for trimming tools of the type disclosed in U.S. Pat. No. 4,347,880 is preferably an air compressor driven by engine 26 and including a pressure outlet 36 that communicates with a coiled main conduit 38 to carry compressed air to the respective connectors 22 carried by trailer 14. Alternatively, if desired, power source 28 can be an hydraulic pump, in order to provide pressurized hydraulic fluid at the respective connectors 22 for hydraulically operated trimming tools, or power source 28 can be an electric generator driven by engine 26 for providing electrical power at connectors 22 to operate electrically powered trimming tools.

Trailer 14 includes a frame 40 that carries an axle 42 to rotatably support a pair of spaced wheels 44. Trailer 14 is suitably connected with vehicle 10 by means of a connecting pin 46 or the like, or any other suitable connection as is well known to those skilled in the art. Frame 40 supports a vertically extending boom 48, which is secured to frame 40 by braces 50. Boom 48 preferably has a tubular structure that includes an outer tube 52 and an inner tube 54 that slidably extends within outer tube 52 to provide a telescopic structure. Outer tube 52 includes a pair of aligned openings to receive a positioning pin 56, and inner tube 54 includes a plurality of pairs of aligned openings that are spaced along the axis thereof to permit vertical adjustment and positioning of inner tube 54 with respect to outer tube 52 at a desired height, depending upon the height of the plants between which the apparatus is intended to pass.

Referring more specifically to FIG. 2, inner tube 54 carries a pair of axially aligned, outwardly extending arms 18, 20 from which the respective connectors 22 extend. Arms 18 and 20 are also preferably telescopic, similar to the vertical boom 48, and each arm includes an outer tube 58 secured to inner tube 54 of vertical boom 48, and an inner tube 60 that is axially slidable within outer tube 58. An aperture and pin arrangement similar to that of boom 48 is provided on arms 18 and 20 to secure the inner and outer tubes thereof in a desired position to provide the desired lateral extension. Additionally, adjustable length guy wires 62 extend from the outermost ends of the respective inner tubes 60 to the topmost end of the vertical boom inner tube 54 for additional support for arms 18 and 20. Further, intermediate supports 64 can be provided as needed, depending upon the length of the telescopic arms.

Extending downwardly from each of telescopic arms 18 and 20 are a plurality of connectors 22, provided at the lowermost ends of coiled branch conduits 66 supported by the telescopic arms. Coiled branch conduits 66 are preferably carried on rings (not shown) or the like, that are slidable along telescopic arms 18 and 20 to a desired position. Additionally, coiled branch conduits 66 communicate with main conduit 38 to provide a direct communication path between power source 28 and connectors 22, to thereby permit the desired number of power operated trimming tools to be attached to the device. Although in the form illustrated in FIG. 1 the apparatus includes trailer 14 for supporting the respective connectors 22, as will become apparent, it is possible to provide boom 48 and its associated connector supporting structure on the vehicle itself, if desired.

Figure 3:
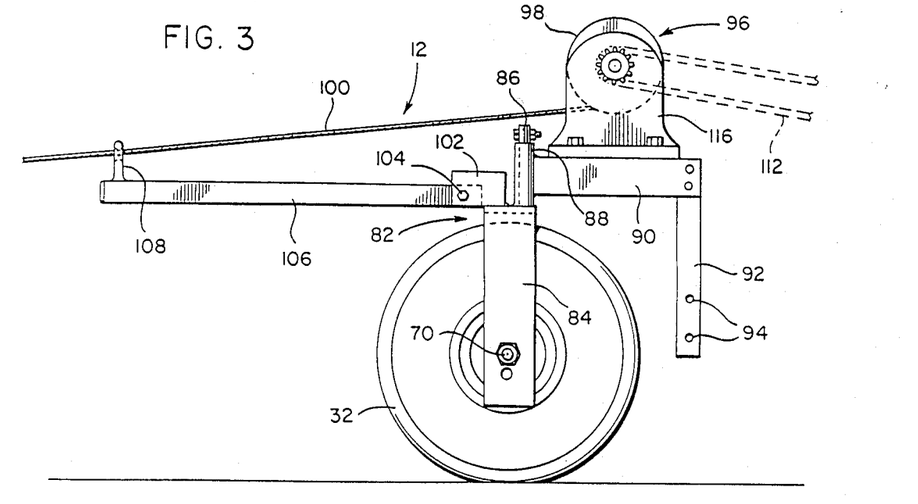
FIG. 3 is an enlarged side view of the self-steering mechanism of the vehicle illustrated in FIG. 1.
Figure 4:
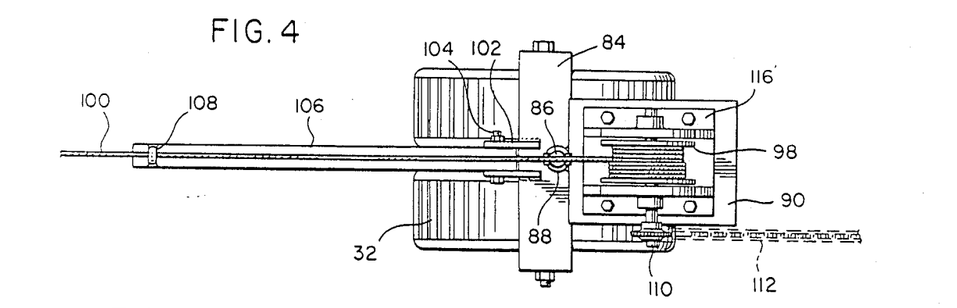
FIG. 4 is a top view of the self-steering mechanism of the vehicle illustrated in FIG. 1.

Steered wheel 32 is rotatably mounted by an axle 70 to a steered wheel carrier designated generally by 82, as should be apparent from FIG. 3. The steered wheel carrier includes steering wheel yoke 84 which rotatably carries steered wheel 32 on axle 70. Steering wheel yoke 84 includes a vertically extending shaft 86 disposed thereon which is rotatably received in a vertically extending sleeve 88 secured to one end of horizontally disposed connecting table 90. Secured to the opposite end of table 90 are vertical connecting bars 92 for attachment to vehicle frame 24 by means of bolts 94 or the like. Table 90 thus interconnects self-steering mechanism 12 and frame 24.

Bolted or otherwise fixed to the planar top surface of connecting table 90 is a winch 96 including reel 98 about which cable 100 is wound. Cable 100 is anchored to any desired object or to the ground at its unwound end (not shown) at a distance of roughly 600 feet from reel 98. As the cable is wound up onto reel 98, vehicle 10 is pulled toward the anchored end of cable 100. As shown in FIG. 1, power is supplied to driving wheels 30 in part by an endless chain 120 disposed about rotary output shaft 114 and sprocket 122; it should be understood, however, that other suitable arrangements for transmission of power from engine 26 to driving wheels 30 could be used.

Steering wheel yoke 84 carries on its top surface a bracket 102 which supports a horizontally extending pin 104 passing through an end of a steering lever 106 to define a horizontal pivot axis about which the steering lever 106 can pivot. At the end of steering lever 106 opposite the end through which pin 104 passe is disposed a cable guiding element 108 which may be, for example, an eye or hook type fixture. Thus, as cable 100 is wound up onto reel 98, cable guiding element 108 will cause steering lever 106 to constantly orient itself towards the unwound end of cable 100 which is anchored to the ground or to any object toward which vehicle 10 is to move.

Reel 98 of the winch is integrally formed with or otherwise affixed to central axle 110 for rotation about the central axis of the reel. Disposed about the exterior of one end of axle 110 is an endless belt or chain 112 which is also disposed about a rotary output shaft 114 of engine 26. Thus, winch 96 is driven off the same engine 26 as power source 28 and driving wheels 30. Axle 110 of the winch is mounted for rotation on table 90 by winch frame 116.

In operation, support structure 16 for connectors 22 is set at the desired height and lateral extension, depending upon the height and spacing of the plants that are intended to be trimmed. After the unwound end of cable 100 has been anchored to the ground, engine 26 of vehicle 10 is started, and speed control 34 is set for the desired vehicle forward speed.

The start-up of engine 26 drives a power source 28, such as an air compressor, for the trimming tools. Compressed air is provided to the several connectors 22 that depend from telescopic arms 18 and 20. The operators of the respective trimming tools can connect their tools to the connectors 22, and can perform the necessary trimming operations as the vehicle proceeds in the direction of cable 100, without operator attention, at the desired speed. The desired speed is normally between 7 and 10 feet per minute.

As earlier noted, steering lever 106 is constantly oriented toward the unwound end of cable 100 which is anchored to any desired object or to the ground. Wheel 32 is thus steered in such a way that vehicle 1? follows the entire unwound length of cable automatically and while unattended. When the length of the cable has been traversed, the end of the cable may be moved and anchored at another location, cable 100 may be unwound from reel 98 and the operation outlined above may be repeated until an entire field, orchard or vineyard has been trimmed.

Figure 5:
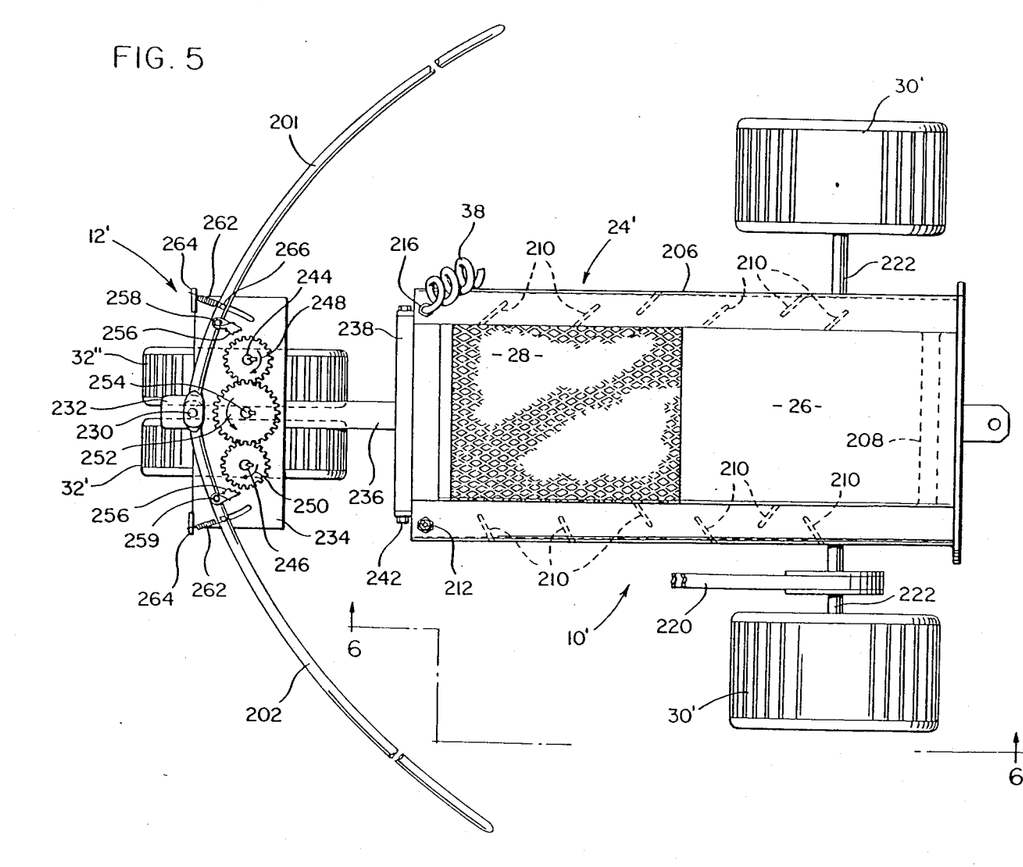
FIG. 5 is a view of a vehicle with second self-steering mechanism in accordance with the present invention as seen in the direction indicated by line 5—5 of FIG. 6.
Figure 6:
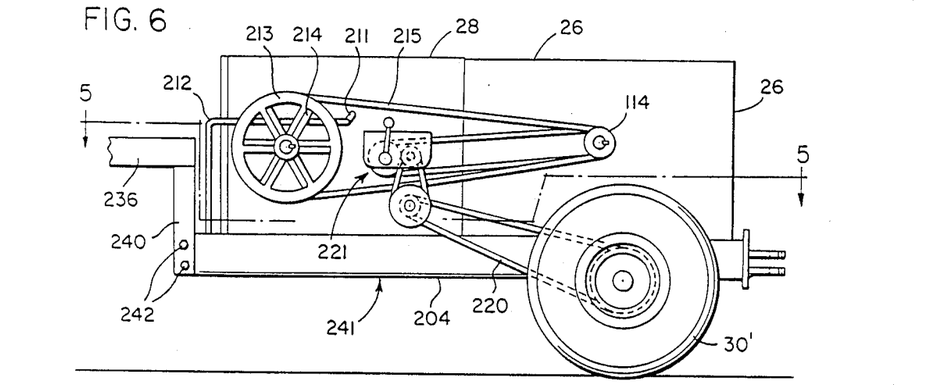
FIG. 6 is a side view of a portion of the vehicle illustrated in FIG. 5 as seen in the direction indicated by line 6—6.

Referring now to FIGS. 5-7, a modified embodiment of the self-propelled vehicle portion of the invention, designated 10', is illustrated. This particular embodiment includes both a novel self-steering mechanism 12' and a novel frame 24' supporting an engine 26 and a power source 28 in any suitable manner. The self-propelled vehicle portion 10' is used in conjunction with the wheeled trailer 14 in the same manner as previously described self-propelled vehicle portion 10, with the engine and power source supplying compressed air or gas via a main conduit 38 to connectors 22. In this embodiment, however, steering of the vehicle 10' is accomplished by feelers 201, 202 extending outwardly of the self-propelled vehicle portion rather than by the use of a cable. Also, in this embodiment, frame 24' is constructed as an unique moisture condensing system to remove moisture from pressurized air or gas prior to use of the pressurized air or gas to operate the trimming tools.

Frame 24' comprises two elongated steel tubes 204, 206 disposed parallel to one another and connected together at adjacent ends thereof by a bridge tube 208. The steel tubes preferably have an outer diameter ranging anywhere from 3 to 6 inches and a wall thickness of approximately 3/16 inch. Each of the elongated steel tubes 204, 206 are fitted with baffles 210 to trap and remove moisture from compressed air passing through the tubes as will presently be described.

The power source 28, which preferably is an air compressor as set forth above, has connected to the pressurized air or gas outlet 211 thereof a roughly 1/2" to 5/8" diameter copper conduit 212. Fast cooling of pressurized air or gas, which is heated by its compression in the power source 28, will take place in copper conduit 212. Conduit 212 passes adjacent a specially designed flywheel 213, mounted rotatably either on frame 24' or power source 28 and including fan blades 214. The flywheel 213 is driven by rotary output shaft 114 via belt 215. As flywheel 213 rotates, fan blades 214 force air to pass over conduit 212 to quickly cool pressurized air flowing through conduit 212. This fast cooling causes moisture to condense out of the compressed air or gas.

The cooled, compressed gas is led by copper coil conduit 212 to one end of first tube 204. Because tube 204 has a larger inner cross sectional area than conduit 212, the compressed gas is caused to expand. The gas passes into tube 204 and sequentially through the tube 204, connecting tube 208 and tube 206, and exits through outlet 216 provided in tube 206. Outlet 216 communicates with coiled main conduit 38 to carry compressed gas to the respective connectors 22 carried by trailer 14 as previously described.

Baffles 210 fitted within the steel tubes 204, 206 trap moisture condensed from the compressed gas after it has been cooled in the copper conduit 212. The trapped moisture may be drained in any suitable way from the interior of the tubes 204, 206 such as, for example, through drain petcocks fitted to the undersides of the tubes.

Through the use of frame 24', including tubes 204 and 206, a unique moisture removal system is provided. Since pruning is often done when the ambient air temperature is at or below the freezing temperature of water, it is desirable to minimize the moisture content of the compressed gas which is used to operate the trimming tools so that the presence of ice in the connecting air conduits and freeze up of the air operated trimming tools is avoided.

Wheels 30' in this embodiment are again driven by engine 26 in any suitable manner; in FIG. 6, the drive mechanism is shown as including an endless chain or belt 220 driven, via variable speed transmission device 221, by rotary output shaft 114 of engine 26. The chain or belt 220 in turn drives axle 222, thereby rotating wheels 30' affixed thereto. Wheels 30' thus again constitute drive wheels which are driven by rotary output shaft 114 of the engine.

In the embodiment of FIGS. 5-7, winch 96 is not present. The novel self-steering mechanism illustrated in FIGS. 5 and 7 includes feelers 201 and 202 as noted above instead. Feelers 201 and 202 are attached together at adjacent pivoting ends by a pin 230 which forms an axis about which feelers 201 and 202 pivot. Pin 230 passes through the pivoting ends of feelers 201 and 202 and into an extension 232 of base plate 234 which is fixed to an end of horizontal connecting bar 236 by welding or the like. Base plate 234 forms a carrier for steerable wheels 32', 32" as will presently be described. Connecting bar 236 has at its end opposite that to which base plate 234 is fixed a transversely extending connecting bar 238. At both ends of connecting bar 238 is a vertical connecting bar 240 attached to frame 24' by connectors 242, which may be screws, for example.

Base plate 234 has two pins 244, 246 fixed thereto and extending upwardly from the top planar surface thereof. Sprockets 248, 250 are mounted for rotation on the top planar surface of base plate 234 about pins 244, 246. Disposed between sprockets 248, 250 and including teeth intermeshed with the teeth of the sprockets 248, 250 is a third sprocket 252 which is keyed or otherwise positively connected to a shaft 254. Shaft 254 passes through base plate 234 and is integrally formed with or otherwise positively connected to the central portion of an axle extending between steerable wheels 32' and 32" about which axle the wheels rotate.

A ratchet catch 256 is pivotally connected to each feeler 201 and 202 via pin 258 affixed to feeler 201 and pin 259 affixed to feeler 202. Ratchet catches 256 are oriented in a rest position as shown in FIGS. 5 and 7 by any suitable means; in FIG. 7, centering a spring 260 is shown as maintaining the ratchet catch 256 on feeler 201 in its rest position. Ratchet catch 256 on feeler 202 is similarly oriented and maintained in its rest position.

Referring to FIG. 7, the cooperation between feeler 201 and other elements of the novel self-steering mechanism 12' will be apparent. It should be clear that feeler 202, which is not shown in FIG. 7 for the sake of simplicity, cooperates with elements of the self-steering mechanism in an identical fashion. Feeler 201 is spring biased about pin 230 by tension spring 262. Tension spring 262 is streched between upstanding spring hold back tab 264 integrally formed with base plate 234 and an upwardly extending portion of a vertically oriented pin 266 passing through feeler 201. Pin 266 also includes a portion extending downwardly into an opening or slot 268 formed in base plate 234. Opening 268 both guides and limits the pivotal movement of feeler 201 about pin 230 by cooperation of pin 266 with the opening.

Referring now to FIGS. 5 and 7, as self-propelled vehicle 10' moves forwardly along the ground, it may pass a fixed object, such as a tree or shrub. Feelers 201 and 202 of self steering mechanism 12' are designed to prevent the vehicle from passing too closely to such a fixed object.

If either feeler 201 or feeler 202 contacts a fixed object, it will be caused by such contact to pivot in a direction away from tabs 264. Referring specifically to FIG. 7, the cooperation between feeler 201 and the other elements of self-steering mechanism 12' will now be described, it being understood that feeler 202 cooperates in a similar manner with the elements of the self-steering mechanism.

Prior to contacting a fixed object, feeler 201 is biased by tension spring 262 into an initial position. The feeler 201 is retained in this initial position via abutment of the downwardly extending portion of pin 266 with an end of opening 268 under the force of the tension spring. After contacting a fixed object, feeler 201 is pivoted in a clockwise direction, as seen in FIG. 7, about pin 230. Tension spring 262 is stretched as a result of its cooperation with pin 26, thereby providing a restoring force on feeler 201 which tends to cause the feeler to pivot in the counterclockwise direction as seen in FIG. 7 about pin 230 and back into its initial position.

Ratchet catch 256, which is pivotally mounted on feeler 201, is moved inwardly toward sprocket 248 by feeler 201 as it pivots. Upon sufficient pivotal movement of feeler 201, the toothed end of ratchet catch 256 will engage the teeth of sprocket 248. Further pivotal movement of feeler 201 will then force ratchet catch 256 to pivot in a counterclockwise direction about pin 258 against the force of centering spring 260 while simultaneously forcing sprocket 248 to rotate in a clockwise direction about pin 244. Clockwise rotation of sprocket 248 in turn causes counterclockwise rotation of sprocket 252 because of the toothed engagement therebetween. Sprocket 252, being positively connected to shaft 254, causes shaft 254 to also rotate in the counterclockwise direction. Since shaft 254 is integrally formed with or otherwise positively connected to the central portion of the axle of wheels 32' and 32", it causes the wheels to turn and steer the self-propelled vehicle 10' away from the fixed object contacted by feeler 201. After the self-propelled vehicle has moved away from the fixed object, feeler 201 will no longer contact the fixed object and will be returned to its initial position under the force of tension spring 262.

It should be apparent from FIG. 5 that feeler 202 cooperates in an identical manner with sprocket 250 whenever feeler 202 contacts a fixed object.

It is thus possible for operators of respective trimming tools to connect their tools to the connectors 22 and perform the trimming operations as the vehicle 10' proceeds, without operator attention, in the direction determined by the orientation of wheels 32' 32". Feelers 201, 202 automatically keep wheels 32', 32" properly oriented. Self-propelled vehicle 10' is particularly useful when adjacent rows of vines, trees or shrubs must be trimmed. Feelers 201, 202 will automatically maintain proper alignment of the self-propelled vehicle between the rows as the vehicle advances such that the vehicle will not be propelled into one of the rows.

Figures 8, 9:
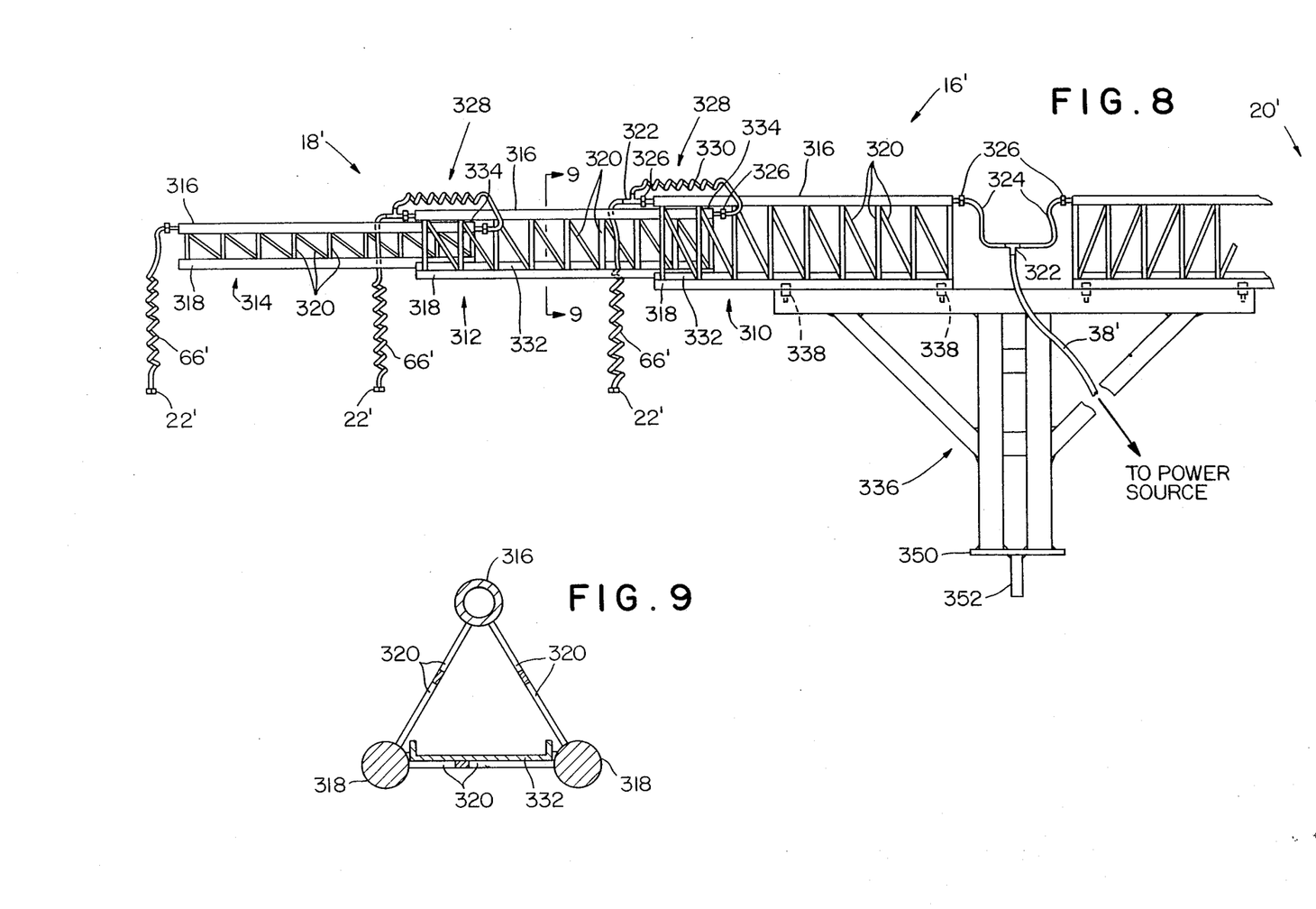
FIG. 8 is a view of an alternative telescopic arm and connector supporting structure.
FIG. 9 is a cross sectional view of the structure illustrated in FIG. 8 as seen along section line 9—9 thereof.

Referring now to FIG. 8, an alternative telescopic arm and connector supporting structure will be described. In FIGS. 8–11, elements which are the same as or similar to elements previously described in connection with FIGS. 1–7 are indicated by reference numbers similar to those used in FIGS. 1–7. FIG. 8 illustrates a supporting structure 16' having telescopic arms 18' and 20'. Arms 18' and 20' support a plurality of connectors 22'. Connectors 22' are each adapted to connect with a power operated trimming tool (not shown) in a manner identical to connectors 22 of FIGS. 1 and 2. Each telescopic arm 18' and 20' is formed of a plurality of telescopic sections. Referring to FIG. 8, arm 18' is shown as being formed by telescopic sections 310, 312 and 314. It should be understood that arm 20', which is only partially shown, is constructed identically to arm 18'. Each telescopic section is approximately ten feet long. Preferably, three, four or five such telescopic sections, per side, are used.

Each telescopic section 310, 312 and 314 is constructed as a lattice which is triangular shaped in cross-section, as is apparent from FIG. 9. The sections each include an upper, light weight hollow tube 316 and a pair of lower base rods or bars 318, which may be either hollow or solid. Tube 316 and rods 318 may be constructed of any conventional metal or metal alloy. In each telescopic section, the tube 316 is rigidly interconnected with a pair of base rods 318 by rod stiffeners 320. Opposite ends of each rod stiffener 320 may be secured to a tube 316 and one of the rods 318 by welding or in any other conventional manner. Base rods 318 of each telescopic section are also interconnected with one another by rod stiffeners in an identical fashion.

A fluid feeder hose 38' extends between a compressor or other such power source 28' (see FIG. 10) and tubes 316 of the innermost telescopic sections 310. Specifically, hose 38' leads from the power source 28' to a branching connection 322, which directs operating fluid, which is preferably compressed air, from power source 28' into branch conduits 324.

At both ends of each hollow tube 316, conventional quick connectors 326, in the form of pressure welded compression fittings, are provided. Each branch conduit 324 is attached to a quick connector 326 mounted at the innermost end of tube 316 of telescopic section 310. At the opposite, outermost end of this tube 316, another quick connector 326 connects the hollow interior of tube 316 to an operating fluid transmission and supply connection, generally designated 328. Connection 328 includes a branching connection 322, which supplies compressed air or other operating fluid from tube 316 of section 310 to both a coiled branch conduit 66' and to a flexible coiled connecting conduit 330. Connecting conduit 330 in turn leads to the innermost end of tube 316 of the successive telescopic section 312. The outermost end of tube 316 of section 312 is provided with another operating fluid transmission and supply connection 328, connecting the hollow interior of tube 316 of the next successive section 312 with the hollow interior of tube 316 of section 314. By this arrangement, the hollow tubes 316, together with connections 328, act as air lines, transferring air supplied from hose 38' both to successive telescopic sections and to successive coiled branch conduits 66'.

A slide guide 332 is welded, bolted or otherwise rigidly affixed to the rod stiffeners 320 extending between base rods 318. Additionally, the tubes 316 of adjacent telescopic sections have cooperating stops 334 provided thereon so that one telescopic section can not be pulled all the way out of the adjacent telescopic section. For mounting arms 18' and 20' on vehicle 10", a mast 336 is provided. The connection between mast 336 and vehicle 10" will be described presently. Innermost telescopic sections 310 are secured by bolts 338 to the mast.

Although an integrally constructed, one piece mast 336 is illustrated in FIG. 8, a mast of variable height to accommodate men standing on the mast or vehicle 10" or to elevate the height of connectors 22' for men working off the ground in orchards and parks, may be provided.

FIG. 8 illustrates the telescopic arm structure of the present invention in its fully extended, or operating position. When the arms 18' and 20' of the present invention are in the position shown in FIG. 8, compressed air or other operating fluid may be supplied from power source 28' to connectors 22' to operate the trimming tools connected thereto. After the trimming operation has been completed, arms 18' and 20' may be moved from the extended position shown in FIG. 8 to a contracted position, in which telescopic section 314 is substantially completely nested or received within telescopic section 312 and both sections 312 and 314 are nested or received within section 310 in the manner illustrated in FIG. 10. The telescopic arm structure may be moved to its contracted position so that the supporting structure is made compact for storage.

To move arms 18' and 20' from the extended position shown in FIG. 8 to the contracted position, telescopic section 314 is manually pushed toward mast 336. As section 314 is pushed toward the mast, rods 318 of section 314 slide along the underlying guide 332 secured to section 312. After section 314 has been slid substantially completely into section 312, both sections 314 and 312 are slid in similar fashion into innermost telescopic section 310. The arms are then in the contracted position. It should be noted that because each connecting conduit 330 is made of a flexible material, such as rubber, connections 328 are able to accommodate repeated movements of arms 18' and 20' between their extended and contracted positions.

Figure 10:
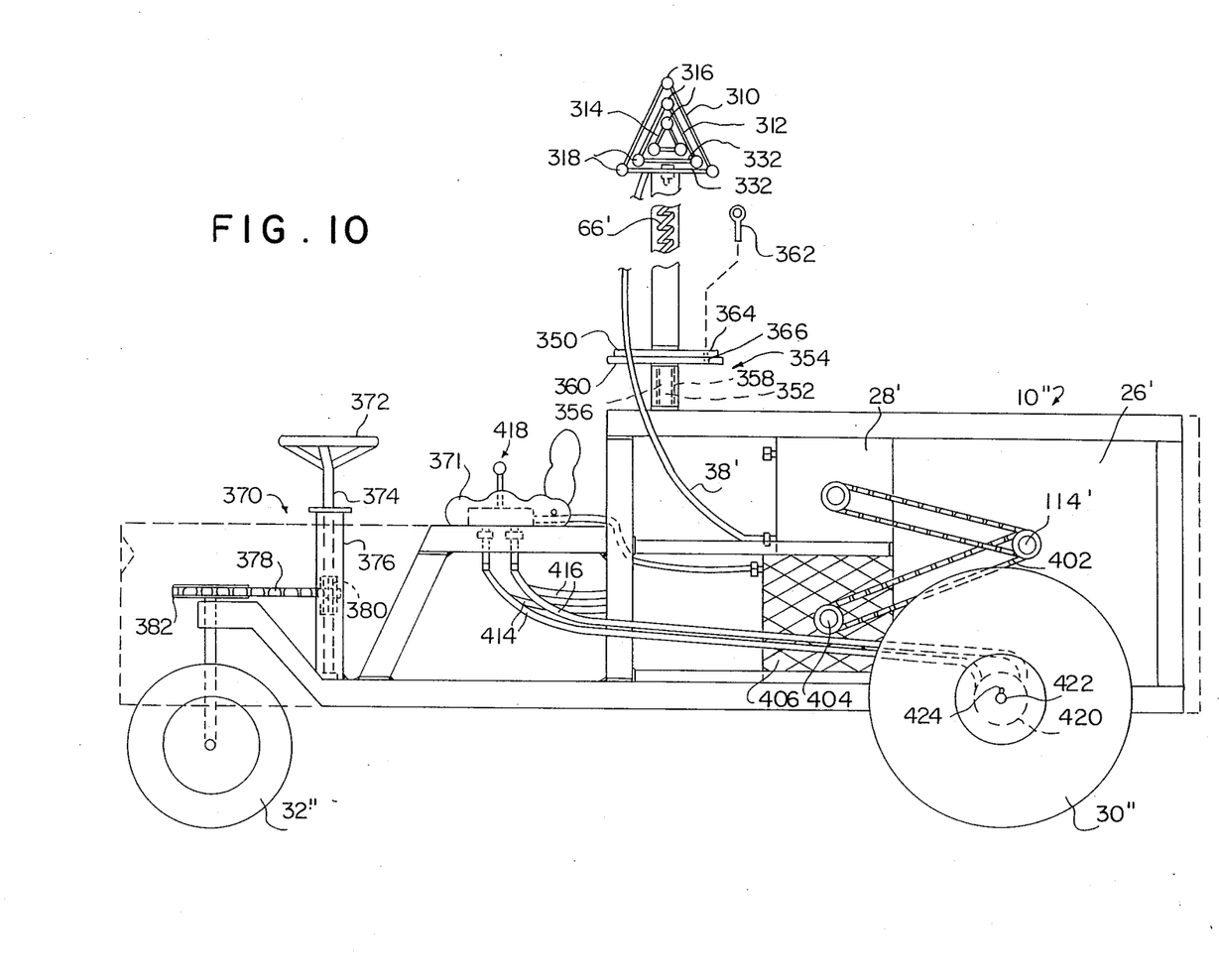
FIG. 10 is a view of the alternative telescopic arm and connector supporting structure mounted on a vehicle which can be ridden by an operator.

At the bottom of mast 336, an approximately ⅜ to ½ inch round plate 350 is provided. Welded or otherwise secured to plate 350 is a downwardly extending shaft 352. Shaft 352 is adapted to be inserted in a corresponding bore formed in a mounting device 354 which is provided directly on vehicle 10". The mounting device is positioned on vehicle 10" such that when the structure 16' is mount@d on vehicle 10", the mast 336 is positioned forward of the axle of wheel 30". As illustrated, the mounting device 354 comprises a pedestal 356 having a central bore 358 formed therein and a ⅜ to ½ inch plate 360, abutting the plate 350 when shaft 352 is inserted in bore 358.

A pin 362 is also provided and is insertable into alignable apertures 364, 366 formed in plates 350 and 360 when supporting structure 16' is to be mounted on vehicle 10". Pin 362 thus locks the supporting structure in position on the vehicle and prevents rotation of the supporting structure relative to vehicle 10".

In order to enable an operator to drive the vehicle 10" to and fro in, for example, an orchard, a steering arrangement, generally designated 370, is provided at the fore end of the vehicle. While the vehicle is being driven, the operator is generally seated in seat 371. Arrangement 370 includes steering wheel 372 rigidly affixed to an end of steering shaft 374 which is rotable within a steering shaft housing 376. A belt or chain 378 passes about a gear element 380 and about a gear element 382 such that when an operator turns wheel 372, gear element 382 rotates. Rotation of gear element 382 causes steered wheel or wheels 32" to turn in a manner which is clear from FIG. 10.

Figure 11:
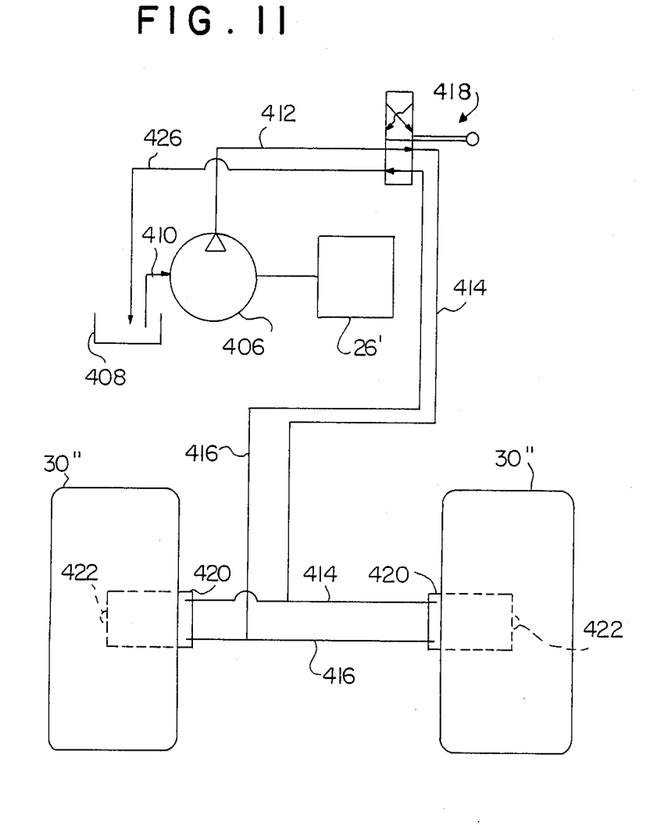
FIG. 11 is a schematic representation of the hydrostatic drive circuit of the vehicle illustrated in FIG. 10.

Referring now to FIGS. 10 and 11, the hydraulic drive of vehicle 10" will be described. Rotary output shaft 114' of engine 26' has an endless belt or chain 402 disposed about its exterior. The belt or chain 402 is also disposed about the exterior of an input shaft 404 of a hydraulic pump 406 or similar power source. Hydraulic pump 406 is thus driven via belt or chain 402 when engine 26' is operating in a manner similar to that by which power source 28' is driven. It should be noted at this point that the particular construction of pump 406 is entirely conventional and well known to those skilled in the art.

As pump 406 is driven by engine 26', hydraulic fluid is drawn by the pump from fluid reservoir 408 through conduit 410 and forced by the pump into supply conduit 412. The operator can control the rate at which pump 406 operates by a conventional hand or foot control in order to provide the correct travelling speed to vehicle 10". Fluid from supply conduit 412 is supplied to conduit 414 to drive vehicle 10" in a forward direction or to conduit 416 to drive vehicle 10" in a backward direction, depending on the position of a select valve 418.

As illustrated in FIG. 11, select valve 418 is positioned so that hydraulic fluid is supplied from conduit 412 to conduit 414 in order to drive vehicle 10" in a forward direction. Fluid is supplied from pump 406 through conduit 414 to hydraulic motors 420 so that motors 420 cause driving wheels 30" to rotate, as will be described presently. Vehicle 10" is therefore driven forwardly. It should be noted that hydraulic motors 420 are entirely conventional and, for example, may be impeller type hydraulic motors. As is schematically illustrated in FIGS. 10 and 11, hydraulic motors 420 include output shafts 422 which act as stub axles of wheels 30". Rotary motion may, for example, be transmitted from output shafts 422 to wheels 30" by a keyed connection 424 between wheels 30" and stub axle 422.

After the hydraulic fluid has passed from conduit 414 through hydraulic motors 420, the fluid travels into conduit 416, which carries the hydraulic fluid back to select valve 418. The hydraulic fluid then passes through select valve 418 to a return conduit 426, which returns the fluid to reservoir 408.

In the event it becomes desirable or necessary to drive the vehicle 10" rearwardly, select valve 418 is manually shifted by the operator from the position shown in FIG. 11 into its alternative position, in which fluid is supplied from conduit 412 to conduit 416 rather than to conduit 414. As is clear from FIG. 11, hydraulic fluid will then flow in an opposite direction through conduits 414 and 416. When fluid is supplied to conduit 416 rather than conduit 414, the direction in which hydraulic motors 420, and therefore wheels 30", rotate is reversed. The vehicle therefore is driven in the opposite direction.

Although particular embodiments of the present invention have been illustrated and described, it will be apparent to those skilled in the art that various changes and modifications can be made without departing from the spirit of the present invention. It is therefore intended to encompass in the appended claims all such changes and modifications that fall within the scope of the present invention.

We claim:

1. A vehicle for supplying power to a plurality of power driven plant trimming tools, comprising:
    (a) a wheeled vehicle having a pair of driving wheels mounted on a vehicle frame, at least one steered wheel rotatably mounted on the vehicle frame and pivotal about a vertical axis for steering said vehicle, an engine supported by the vehicle frame, and a power source driven by said engine for supplying said power to said power driven plant trimming tools;

(b) a telescopic arm and connector supporting structure having a pair of telescopic arms, a plurality of telescopic sections forming each said telescopic arm, each telescopic section constructed as a lattice, a hollow tube forming a part of each said lattice interconnected with hollow tubes forming a part of other lattices of said telescopic arm, an operating fluid transmission and supply connection disposed between adjacent telescopic sections for both supplying power from said power source to said power driven plant trimming tools and for fluidly interconnecting said adjacent telescopic sections; and (c) hydraulic drive means for propelling said vehicle, said hydraulic drive means also being driven by said engine.

2. A vehicle as defined by claim 1, wherein said hydraulic drive means comprises:
a hydraulic pump driven by said engine;
a hydraulic fluid reservoir from which fluid is drawn by said pump;
hydraulic motors for transmitting rotary motion to said driving wheels;
a first conduit to which fluid is supplied from said pump in order to drive said vehicle in a forward direction;
a second conduit to which fluid is supplied from said pump in order to drive said vehicle in a rearward direction;
a select valve, manually shiftable between a first position, in which fluid is supplied from said pump to said first conduit, and a second position, in which fluid is supplied from said pump to said second conduit, to allow an operator selectively drive said vehicle in a forward or a rearward direction.

3. A hydraulic drive means for propelling a vehicle for supplying power to a plurality of power driven plant trimming tools, comprising:
a hydraulic pump driven by an engine;
a hydraulic fluid reservoir from which fluid is drawn by said pump;
hydraulic motors for transmitting rotary motion to driving wheels for driving said vehicle;
a first conduit to which fluid is supplied from said pump in order to drive said vehicle in a forward direction;
a second conduit to which fluid is supplied from said pump in order to drive said vehicle in a rearward direction;
a select valve, manually shiftable between a first position, in which fluid is supplied from said pump to said first conduit, and a second position, in which fluid is supplied from said pump to said second conduit, to allow an operator selectively drive said vehicle in the forward or the rearward direction.

* * * * *